(No Model.)
F. B. SHEARER.
DENTAL PLATE.
No. 269,966.  Patented Jan. 2, 1883.
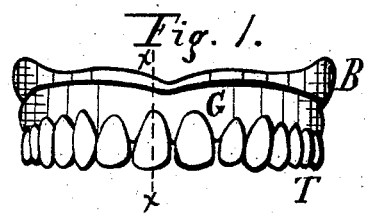
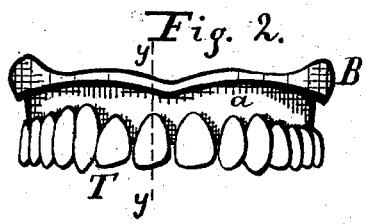
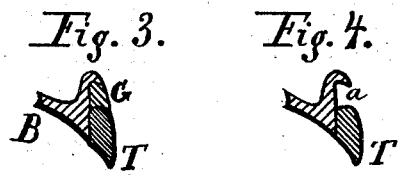
Witnesses:
Geo. B. Selden.
W. W. Serar
Inventor:
Frank B. Shearer

UNITED STATES PATENT OFFICE.

FRANK B. SHEARER, OF ROCHESTER, NEW YORK, ASSIGNOR TO HIMSELF AND WILLIAM W. SHERAR, OF SAME PLACE.

DENTAL PLATE.

SPECIFICATION forming part of Letters Patent No. 269,966, dated January 2, 1883.

Application filed July 29, 1880. (No model.)

*To all whom it may concern:*

Be it known that I, FRANK B. SHEARER, of the city of Rochester, in the county of Monroe, in the State of New York, have invented an Improvement in Dental Plates, and in the process of manufacturing the same, of which the following is a specification, reference being had to the annexed drawings, in which—

Figure 1 is the front elevation of a dental plate embodying my improvements. Fig. 2 is a front elevation of the same as it appears before the gum composition is applied. Fig. 3 is a vertical section on the line $x\ x$, Fig. 1. Fig. 4 is a vertical section on the line $y\ y$, Fig. 2.

The object of my invention is the production of an improved dental plate of superior quality in a cheaper and more expeditious manner than has been previously practiced; and my invention consists in an improved dental plate, consisting of a base, with plain teeth attached thereto, and having a continuous gum of suitable composition applied around the teeth.

My invention also consists in the process of manufacturing my improved dental plate, as hereinafter more fully set forth.

In the manufacture of my improved dental plates I proceed as follows: The base is formed of metal, rubber, or other materials in the usual way. Plain teeth are affixed to the plate in the usual manner, care being taken to place the teeth in positions which, as nearly as possible, imitate the natural arrangement. In forming the base a groove or recess is left about the plate above the teeth for the reception of the gum composition. After the base is formed and the teeth affixed thereto the recess for the gum composition is filled with wax, plaster-of-paris, or other suitable material, which filling is shaped to imitate the natural gum as nearly as possible. A mold is then made of the plate, teeth, and filling. The filling is then removed and enough of the gum composition introduced to fill the groove. The plate is then subjected to heat, and the gum composition is brought to its place by pressure, being caused by the mold to conform itself exactly to the shape of the filling. The plate is then removed from the mold and the gums finished by polishing, or, if necessary, shaping with a cutting instrument. If a suitable cement is used to fill the groove around the teeth, it may be applied directly with a spatula without the use of molds.

Referring to the accompanying drawings, B is the base of the plate; T, the teeth; $a$, the groove or recess around the teeth for the gum composition, and G the continuous gum.

Various compositions may be employed for the gums. I prefer to use a composition made from gutta-percha, colored with vermillion, and mixed with any suitable impalpable mineral powder for the purpose of giving it weight and solidity. Finely-ground glass, porcelain, or other substances may be employed to accomplish this. I employ these ingredients in approximately the following proportions by weight: gutta-percha, one-third; vermillion, one-sixth; and the balance, or one-half of the composition, of the ground material. I do not confine myself, however, to these proportions of the ingredients, as they will require to be varied in consequence of the difference in color of different samples of gutta-perch, or according to the tint desired in the finished composition. The weight and solidity of the composition may also be varied by using different proportions of the mineral powder. These ingredients must be thoroughly incorporated with the gutta-percha by any of the usual processes employed by the manufacturers of articles of india-rubber or gutta-percha.

The degree of heat to be employed in shaping the gutta-percha compound into the form of the gums will vary with its density. A compound made in the proportions before specified may be worked at a temperature of 212° Fahrenheit; but a greater heat may be employed.

Cements may be employed for the gum composition, such as are now employed for filling teeth, by adding a suitable coloring-matter, or any other cements which are sufficiently durable and have the property of withstanding the acids of the mouth. Celluloid may also be used, being applied in substantially the same manner as already explained with regard to the gutta-percha compound.

The gum composition may extend to the upper margin of the base, being held in position on the base by pins, dovetailed grooves, corrugations, or any other convenient means. Where the upper margin of that portion of the plate constituting the gums is formed by the base, as shown in the drawings, I prefer to give the upper edge of the groove *a* a beveled form, in order to retain the gum composition in place, as shown in Figs. 3 and 4.

My invention is equally well adapted to the manufacture of whole or partial plates.

My improved dental-plate has the following advantages over all others heretofore made. It employs plain teeth, which are cheaper than gum-teeth. The teeth are more easily arranged, and can be set irregularly to more nearly imitate the natural dentition. A more perfect articulation can be obtained, and in less time than when gum-teeth are used. My improved dental plate is much more cleanly than a plate made with gum-teeth, having joints and generally unfilled cavities between the base and gums, in which the food collects and decomposes. In my improved dental plate joints are entirely avoided, and the gum is continuous from end to end. The gum composition entirely fills the groove around the teeth. The expense of the molds in which gum-teeth are manufactured necessarily limits their variety, while by my improved process of manufacturing dental plates the gums may be given any desired configuration to correspond with the requirements of the form of any patient's mouth. The adaptability of the process to any given case is only limited by the skill of the operator. Many irregularities or deformities occur to which it is impossible to adapt the ordinary gum-teeth, whereas by my improved mode of manufacture the teeth may be readily set or the gums shaped to suit any case which may arise.

I hereby disclaim anything shown or described in the patents of S. E. Hayes, January 27, 1857, No. 16,482; J. A. McClelland, June 1, 1869, No. 90,765; D. Steinberg, November 12, 1861, No. 33,716; and E. K. Jenner, November 2, 1869, No. 96,438.

I claim—

1. A dental plate consisting of the following elements, viz: a mouth-plate, B, comprising the entire surface which requires to be fitted to the mouth of the wearer, a series of gumless teeth, T, fixed firmly thereto and borne thereby, and a superficial exposed gum, G, of suitable pink pyroxyline compound, fixed to and concealing that portion of the plate B which is liable to be exposed to view when in the mouth of the wearer, and capable of removal without detaching the teeth from the plate B, substantially as set forth.

2. A dental plate consisting of a body portion, B, comprising the entire surface which requires fitting to the mouth, formed of vulcanite or similar vulcanizable substance, and bearing the gumless teeth T, whose roots are partially embedded in it, and partially exposed in a recess, *a*, formed in its facial portion wherever the latter is apt to be exposed to view when in use, and a superficial gum, G, of pink celluloid or similar pyroxyline compound inlaid in said recess and adhering to the surface of the plate B therein, and to the roots of the teeth, and capable of removal without detaching the teeth from the plate B, substantially as set forth.

FRANK B. SHEARER.

Witnesses:
GEO. B. SELDEN,
W. W. SHERAR.